O. N. BOYER.
FRUIT GRADER.
APPLICATION FILED JULY 29, 1920.
1,386,549.
Patented Aug. 2, 1921.
5 SHEETS—SHEET 1.
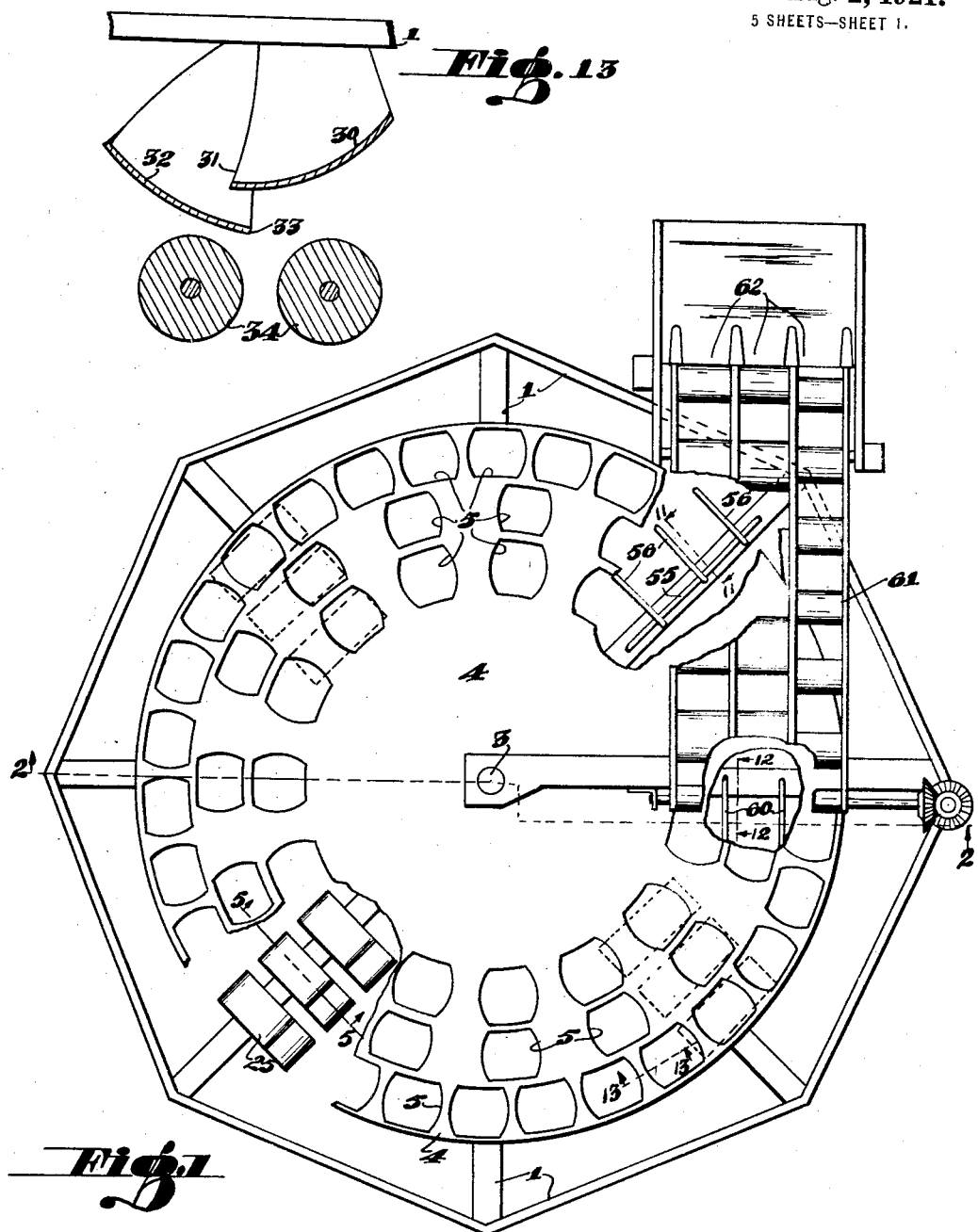
INVENTOR.
Orin N. Boyer
BY
ATTORNEYS

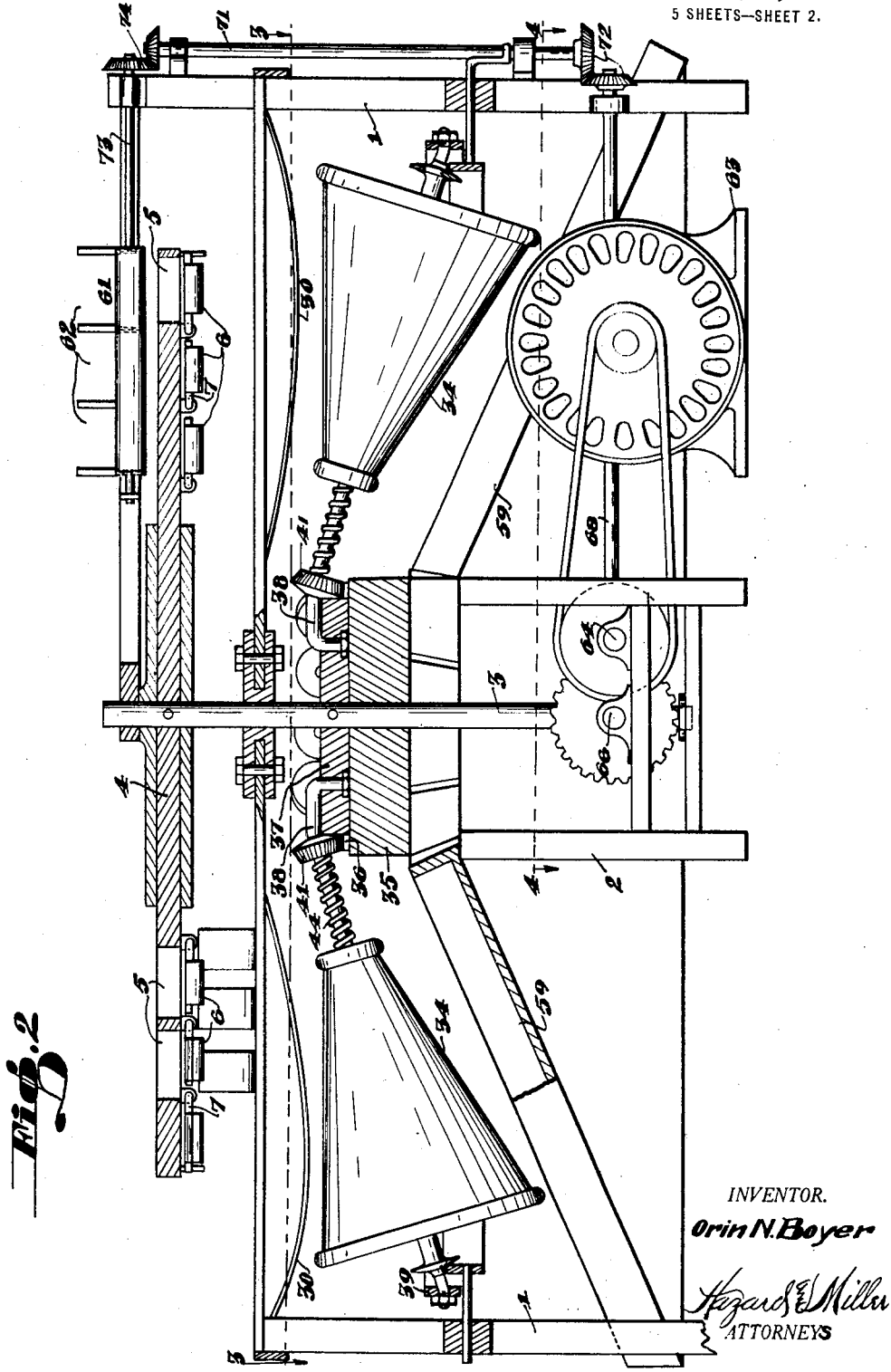

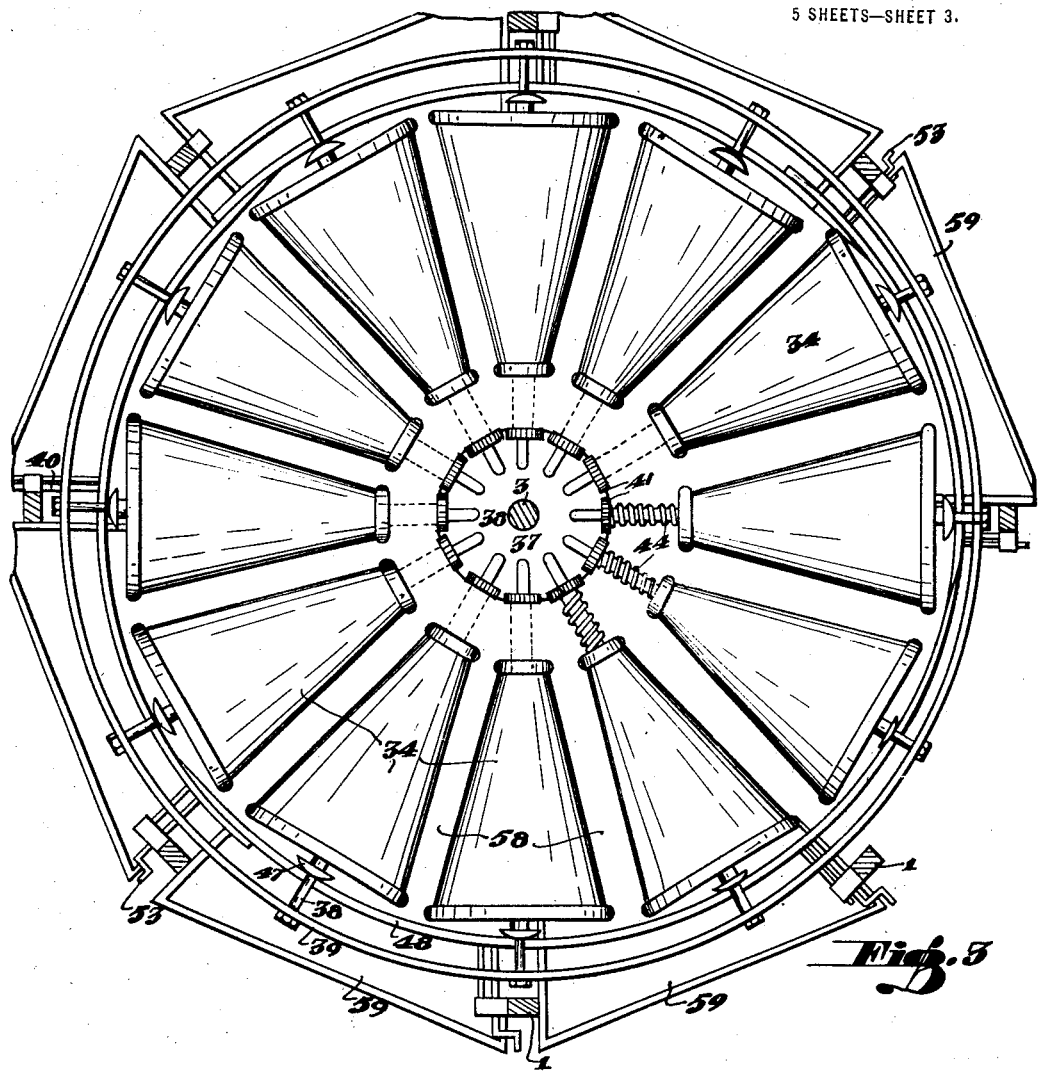

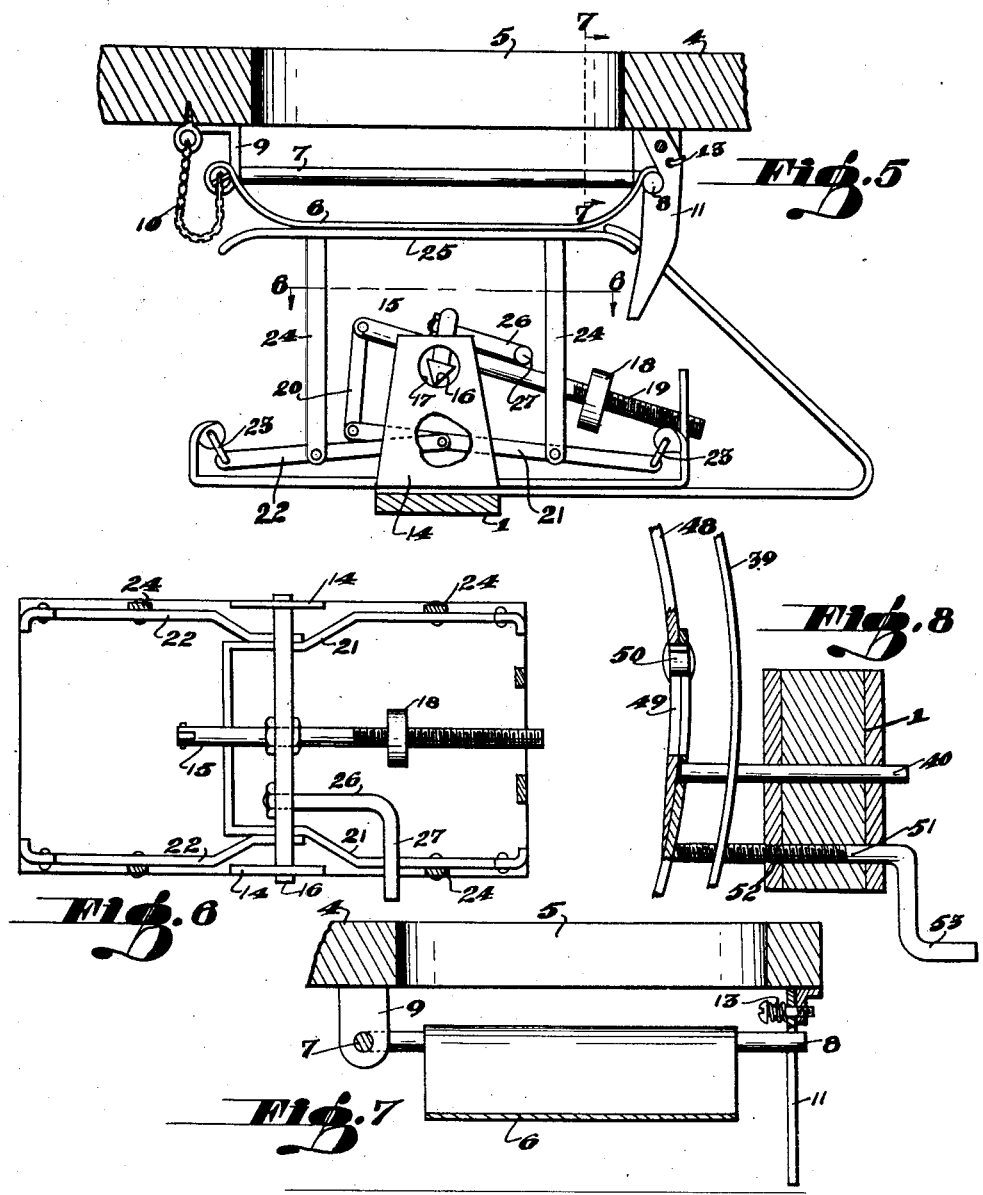

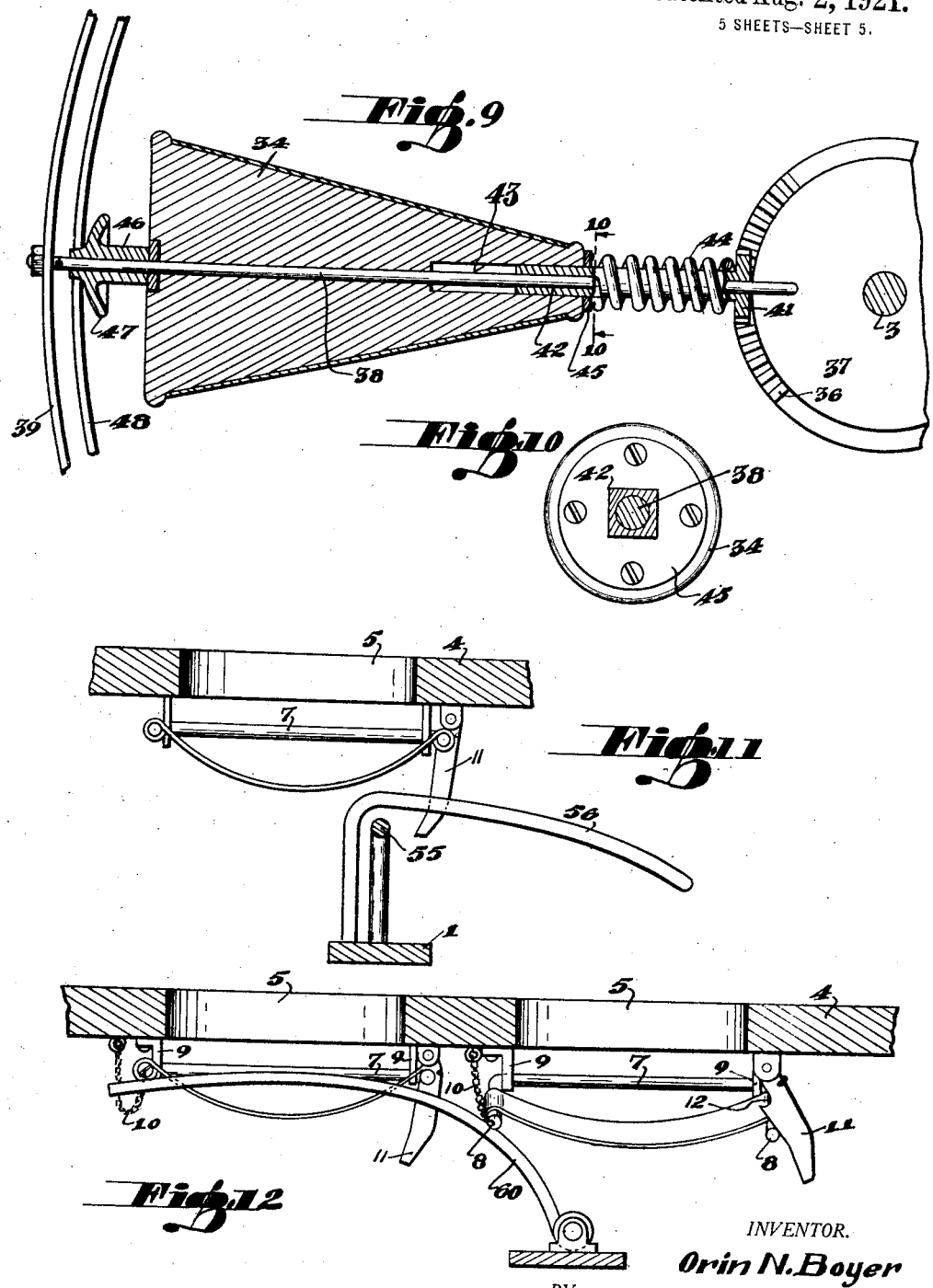

UNITED STATES PATENT OFFICE.

ORIN N. BOYER, OF LONG BEACH, CALIFORNIA.

FRUIT-GRADER.

1,386,549.  Specification of Letters Patent.  Patented Aug. 2, 1921.

Application filed July 29, 1920. Serial No. 399,959.

*To all whom it may concern:*

Be it known that I, ORIN N. BOYER, a citizen of the United States, residing at Long Beach, in the county of Los Angeles and State of California, have invented new and useful Improvements in Fruit-Graders, of which the following is a specification.

This invention relates to fruit graders and has for its object the provision of an apparatus adapted to first grade the fruit according to weight and to then grade these various classes of fruit according to sizes.

The invention will be readily understood from the following description of the accompanying drawings, in which—

Figure 1 is a plan view of the apparatus partly broken away.

Fig. 2 is a transverse section on the line 2—2 of Fig. 1.

Fig. 3 is a horizontal section on the line 3—3 of Fig. 2.

Fig. 4 is a horizontal section on the line 4—4 of Fig. 2.

Fig. 5 is a detail section on the line 5—5 of Fig. 1.

Fig. 6 is a horizontal section on the line 6—6 of Fig. 5.

Fig. 7 is a vertical section on the line 7—7 of Fig. 5.

Fig. 8 is a detail horizontal section taken on the plane of Fig. 3.

Fig. 9 is a longitudinal section through one of the grading rollers.

Fig. 10 is a transverse section on the line 10—10 of Fig. 9.

Fig. 11 is a detail section on the line 11—11 of Fig. 1.

Fig. 12 is a detail section on the line 12—12 of Fig. 1.

Fig. 13 is a section on the line 13—13 of Fig. 1.

The main frame of the apparatus is shown at 1 provided with a central upwardly extending subframe 2. The main shaft 3 is journaled in upright position in frames 1 and 2, and a radially extending disk platform 4 is fixed for rotation with shaft 3 above the main frame.

The platform 4 is provided with a plurality of circumferential rows of openings 5 arranged in spaced relation one beyond the other. These openings are of such size and shape as to form pockets through which fruit or the like to be graded may pass. A hammock 6 is arranged beneath each of the openings 5 to support the article of fruit deposited in the pockets formed by said openings.

Each of these hammocks is mounted upon a U-shaped frame 7 having the arms 8 of said frame extending transversely beneath opening 5 at the forward and rear ends of said opening in the direction of rotation of platform 4. The base 7 of the U-shaped frame is journaled in brackets 9 depending from platform 4, and the respective ends of hammock 6 are mounted upon arms 8. A flexible connection 10 connects one of the arms 8 with platform 4 for limiting the downward swing of the hammock upon the pivot provided by base 7. The hammock is normally held in upwardly swinging position by a latch 11 having a recess 12 adapted to engage one of the arms 8. The latch is normally held in engagement with said arm 8 by means of a spring 13.

At circumferentially spaced points scales are arranged beneath each of the circumferential rows of pockets 5. In the drawings I have shown three such scales for each of the rows of pockets. Each of these scales consists of a frame 14 mounted upon the main frame 1. A lever arm 15 is fulcrumed in frame 14 as by means of the knife edge fulcrum 16 adapted to rock in bearings 17 provided in the frame 14. One end of the lever 15 carries a weight 18 which is adjustable along said lever as by means of the threaded engagement 19. A link 20 is pivoted to the opposite end of lever 15 and is in turn pivoted at its opposite end to a rod 21. A similar rod 22 is pivoted to rod 21 and the outer ends of these rods are supported by the link connections 23 from the frame of the scale. Supporting arms 24 extend upwardly from rods 21—22 and carry a platform 25.

The weight 18 will normally retain the parts in position as shown in Fig. 5 with platform 25 in raised position. When in this position hammocks 6 supporting fruits and passing over the scale, are arranged to rest upon said platform so that the weight of the fruit will tend to lower the same. The weight 18 having been previously positioned upon lever 15, fruits of predetermined weight will lower platform 25 against the action of weight 18, while fruits of lighter weight will pass beyond the same without actuating the scale.

A finger 26 extends laterally from fulcrum 16 and is provided with an angularly disposed end 27. This finger is arranged to lie in a plane beneath the lower end of latch 11 when platform 25 is in raised position and is adapted to be swung upwardly so as to abut against latch 11 when the platform is actuated. It will thus be seen that when the weight of a fruit upon platform 25 is sufficient to lower the same the finger 26 will trip the latch holding the hammock supporting said fruit as the rotation of platform 4 continues. As a consequence the hammock will swing downwardly upon the pivot provided by the U-shaped supporting arm and the fruit will roll from the hammock.

It is to be understood that the successive scales over which the articles of fruit pass, as platform 4 is rotated, are adjusted so that only the heaviest fruit will actuate the first scale and succeeding lighter articles of fruit will actuate the succeeding scales. By this arrangement the fruit released from their hammocks 6 at the various scales will be of different grades according to weight.

The fruit when released from its hammocks is dropped upon a chute 30, one of which is arranged beyond each of the scales. The chute is, preferably, of suitable flexible material and supported in radially extending position beneath the main frame 1. This chute is inclined transversely so that the fruit will be discharged therefrom over the edge 31 of said chute to a second radially positioned chute 32 beneath a chute 30 and inclined transversely in order to drop the fruit from said chute over the edge 33 thereof to suitable grading rollers extending around the main shaft 3 and rotatable with the platform 4.

The grading rollers 34 are conical rollers radially disposed relative to the main shaft 3. A disk 35 is mounted in stationary position upon the main frame and the shaft 3 is journaled in said disk. The disk is provided at the periphery of its upper surface with a gear 36. A second disk 37 is fixed upon shaft 3 above disk 35 and is adapted for rotation with said shaft. A plurality of rods 38 are secured to disk 37 and extend radially and downwardly therefrom. The outer ends of rods 38 are connected to an annular ring 39 rotatably supported by bearings 40 of the main frame. Pinions 41 are journaled upon rods 38 in mesh with the gear, and squared sleeves 42 extend outwardly from said pinions and are journaled upon the rods 38.

The rollers 34 are longitudinally slidable upon rods 38 relative to sleeves 42, but are arranged to be rotated by the turning of said sleeves and pinions as by providing axial squared recesses 43 in the ends of the rollers and in which the ends of the squared sleeves 42 are received. Springs 44 are positioned upon sleeves 42 between the pinions 41 and suitable bearing plates 45 fixed to the ends of rollers 34. By this arrangement the rollers are yieldably urged radially outwardly along rods 38. Sleeves 46 extend beyond the outer ends of rollers 34 and are journaled upon the rods 38. Bearing flanges 47 shown as convex surfaces extend radially from the sleeves 46 and are adapted to engage a cam ring 48 for moving rollers 34 inwardly along rods 38 against the tension of springs 44.

The cam ring 48 is made up of a plurality of arcuate sections, the overlapping ends of which are slotted as shown at 49 to receive rivets 50 so that the sections may move circumferentially relative to one another for expanding and contracting the cam ring.

Means are provided for adjustably distorting the cam ring at circumferentially spaced points so that portions of said ring may be forced inwardly to cause the bearing flanges 47 abutting against the same to slide rollers 34 inwardly along rod 38. For this purpose rods 51 are threaded through bearings 52 supported by the main frame, said rods being arranged to impinge against the cam ring at their inner ends and being provided with crank handles 53 at their outer ends.

In circumferentially spaced relation beyond the last one of the grading scales, means are provided for tripping any one of the hammocks 6 which carry fruit of insufficient weight to have actuated any of the grading scales for dumping said hammocks. For this purpose a rod 55 is mounted upon the frame 1 so as to extend across all of the circumferential rows of pockets 5, said rod being in position to engage the latches 11 for releasing the same and thereby tilting the hammocks 6. In order to prevent the hammocks, which have been previously tilted, from catching upon the rod 55, a guide finger 56, preferably, extends from the main frame upwardly and over the rod 55 in alinement with each of the circumferential rows of pockets. The ends of these fingers extend forwardly from rod 55, as shown in Fig. 11, so that any of the hammocks which have been released will ride upwardly over said fingers as the platform of the apparatus is rotated.

It will thus be seen that beyond each of the grading scales, fruits of different weights will be dropped upon the rollers 34, and beyond the rod 55 the culls will be deposited upon rollers 34. The rollers 34 are so spaced from one another as to provide spaces 58 between the same and the rollers are, preferably, of such size and so positioned as to provide two of these spaces beyond each of the scales and to also provide one of said spaces beyond the cull releasing mechanism. A tray 59 is mounted beneath each of the spaces 58 in order to receive the various grades of fruit.

When the pockets 5 have passed beyond the tray positioned to receive the culls, the cyle of operation of the machine is completed and the hammocks are then reset in order to again support fruit deposited upon the platform 4. The mechanism for resetting the hammocks may consist of spring fingers 60 arranged upon the main frame beneath platform 4 and in alinement with each of the circumferential rows of pockets. As the platform rotates the downwardly swung hammocks abutting against the spring fingers will be swung upwardly to cause their latches 11 to reëngage said hammocks.

The fruit to be graded is deposited upon platform 4 just beyond the reset finger 60 as by means of an upwardly inclined endless belt conveyer 61. This conveyer consists of channels 62 alongside one another and in alinement with the respective circumferential rows of pockets. Fruit deposited upon the conveyer will thus be positioned so as to pass down the various channels of the conveyer for depositing said fruit in the pockets of the respective rows.

The driving mechanism for the machine, as thus described, may include a motor 63 arranged to turn a countershaft 64 journaled in the subframe 2. Through a reduction gearing 65 this shaft is arranged to rotate a second countershaft 66 having a bevel gear driving connection 67 with the main shaft 3. The countershaft 64 is also provided with a driving connection to a shaft 68 as by the bevel gearing 69. A universal joint 70 is, preferably, provided in the shaft 68 and an upright shaft 71 may be driven by the shaft 68 through a bevel gearing 72. The shaft 71 is arranged to rotate the shaft 73 for actuating the endless conveyer 61 as through the bevel gearing 74.

In operation, motor 63 will actuate conveyer 61, and will also turn the platform 4 and rollers 34. The fruit released at the first scale will drop to the spaces 58 between the rollers as the latter successively pass the scale.

The cam ring 48 is so arranged that immediately beyond the first scale the cam surface of the ring is distorted inwardly so that the bearing surfaces 47 of the rollers will be engaged by said cam for forcing the rollers inwardly against the tension of their springs 44. As a consequence the width of the spaces 58 will be reduced so as to permit the passage therethrough of only the smaller fruit. The fruit thus passing through the spaces 58 will be collected in one of the trays 59.

Beyond the inwardly distorted portion of the cam ring, and in advance of the second scale, the cam ring curves outwardly so as to withdraw the pressure against bearing surfaces 47 and permit of the outward movement of rollers 34. As a result the spaces 58 will increase in width, and when the rollers are above the second of the trays beyond the first scale, the larger fruit deposited from the first scale will be collected in said tray.

It will thus be seen that the fruit having a predetermined weight, controlled by the first scale, will be deposited in either the first or second tray according to the size of the fruit, or if the fruit is beyond a maximum size for its weight, it will be carried on around by the rollers.

The fruit which is of insufficient weight to be discharged at the first scale is carried on to the second scale and the next lighter grade of fruit is there deposited. In manner similar to that described in connection with the first scale, this lighter grade of fruit is deposited upon the rollers as the latter pass beyond the second scale.

The cam ring 48 beyond the second scale is adapted to first cause the spaces between the rollers to be contracted and then expanded, as previously described, so that the fruit deposited at the second scale will be divided into larger and smaller sizes and the fruits which are of excessive size for their weight will be carried on.

The operation, as previously described, is repeated beyond the third scale and the fruits then remaining upon the rollers will be only those which are of excessive size for their weight. The fruits still remaining in pockets of the platform 4 will be only those which do not reach a predetermined minimum weight, and as the pockets pass across the rod 5 these latter fruits will be deposited upon the rollers. The fruits thus remaining upon the rollers will be the culls, and the cam ring 48 beyond this point is so arranged as to permit the maximum outward radial movement of rollers 34 in order that the spaces between the rollers will be of sufficient width to permit of dumping all of said culls into the tray underlying the rollers at this point.

Continued turning movement of the pockets of the platform will cause the hammocks 6 to be reset as previously described and the cycle of operation is then repeated.

It will be observed that the mechanism as thus set forth provides means for first classifying fruit and the like according to weight and then subdividing each of these classes according to the size of the fruit. The culls, which include the fruit below a minimum weight, as well as the fruit of more than a predetermined size for the various weights, are separately classified.

Various changes may be made without departing from the spirit of the invention as claimed.

What is claimed is:

1. A grading apparatus including means for grading according to weight, and means for separating from said grades those articles which are above predetermined sizes for their various weights.

2. A grading apparatus including means for grading according to weight, means for separating said grades according to predetermined sizes, and means for collecting from said grades those articles which are above predetermined sizes for their various weights.

3. A grading apparatus including means for grading according to weight, means for separating the grades above predetermined weights according to predetermined sizes, and means for collecting those articles which are below said predetermined weights as well as the articles from said grades above predetermined weights which are above predetermined sizes for their various weights.

4. A grading apparatus, including a rotatable platform, supporting pockets hinged at one end to said platform, a plurality of scales arranged beneath said platform and adapted to test the contents of each pocket for grading the same according to weight, latches normally retaining said pockets in upwardly swung position, anl means for releasing said latches to permit downward swinging of said pockets by the weight of articles within the same upon said scale.

5. A grading apparatus including a rotatable platform, supporting pockets hinged at one end to said platform, a plurality of scales arranged beneath said platform and adapted to test the contents of each pocket for grading the same according to weight, latches normally retaining said pockets in upwardly swung position, means for releasing said latches to permit downward swinging of said pockets by the weight of articles within the same upon said scale, and spaced members beneath said scale, said articles when released by the downward swing of said pockets passing through a space between said members.

6. A grading apparatus including a rotatable platform, releasable supporting pockets carried by said platform, a scale beneath said platform, means for releasing said pockets by the weight of articles within the same upon said scale, spaced members beneath said scale, and means for increasing the size of said spaces during rotation of the apparatus, the various sizes of said articles released by said scale being adapted to pass through said spaces at different points during the rotation of the apparatus.

7. A grading apparatus including a rotatable platform, releasable article supporting pockets carried by said platform, a plurality of circumferentially spaced scales beneath said platform, the successive scales being actuated by successively decreasing weights, means for releasing said pockets through actuation of said scales, a plurality of spaced members beneath said scales and rotatable with said platform, means for increasing and subsequently decreasing the size of the spaces between said members beyond each of said scales, and separate collecting spaces beyond each of said scales and arranged to underlie in spaces between said members when said spaces are of decreased and increased size respectively.

8. A grading apparatus including a rotatable platform, releasable article supporting pockets carried by said platform, a plurality of circumferentially spaced scales beneath said platform, which scales are arranged to test the weight of the contents of each pocket, the successive scales being actuated by successively decreasing weights, and a trip beyond the last of said scales for releasing all of said pockets not previously released by said scales.

9. A grading apparatus including a rotatable platform, hinged article supporting pockets carried by said platform, latches for normally retaining the same in upwardly swung position, a scale beneath said platform actuated by predetermined weights of articles supported by said pockets, means for releasing said latches so as to permit downward swinging of said pockets through actuation of said scale, and a spring rod positioned for subsequently engaging said downwardly swung pockets, so as to return the same to upwardly swung position, and automatically engage the same by said latches.

10. A grading apparatus including a rotatable platform, releasable article supporting pockets carried by said platform, a scale beneath said platform actuated by predetermined weights of articles supported by said pockets, means for releasing said pockets through actuation of said scale, spaced radially extending conical rollers beneath said scale and rotatable with said platform, a cam ring surrounding said rollers, means for adjustably distorting said cam ring, and actuating contacts between said rollers and cam ring arranged to alternately axially shift said rollers in reverse directions for decreasing and increasing the width of the spaces between said rollers.

In testimony whereof I have signed my name to this specification.

ORIN N. BOYER.